(12) United States Patent
Venter

(10) Patent No.: US 9,976,483 B2
(45) Date of Patent: May 22, 2018

(54) LUBRICANT SYSTEM

(71) Applicant: ROLLS-ROYCE DEUTSCHLAND LTD & CO KG, Blankenfelde-Mahlow, Dahlewitz (DE)

(72) Inventor: Gideon Daniel Venter, Berlin (DE)

(73) Assignee: ROLLS-ROYCE DEUTSCHLAND LTD & CO KG, Dahlewitz (DE)

(*) Notice: Subject to any disclaimer, the term of this patent is extended or adjusted under 35 U.S.C. 154(b) by 566 days.

(21) Appl. No.: 14/095,371

(22) Filed: Dec. 3, 2013

(65) Prior Publication Data
US 2014/0161591 A1    Jun. 12, 2014

(30) Foreign Application Priority Data

Dec. 11, 2012    (GB) .................................. 1222203.0

(51) Int. Cl.
| | | |
|---|---|---|
| F01D 25/16 | (2006.01) |
| F02C 7/06 | (2006.01) |
| F01D 25/20 | (2006.01) |
| F16H 57/04 | (2010.01) |

(52) U.S. Cl.
CPC ................ *F02C 7/06* (2013.01); *F01D 25/20* (2013.01); *F16H 57/043* (2013.01); *F16H 57/0423* (2013.01); *F16H 57/0426* (2013.01); *F16H 57/0456* (2013.01); *F16H 57/0486* (2013.01); *F05D 2260/40311* (2013.01); *F05D 2260/98* (2013.01)

(58) Field of Classification Search
CPC ..... F04D 29/167; F01D 11/005; F01D 11/006
USPC ......................................................... 415/110
See application file for complete search history.

(56) References Cited

U.S. PATENT DOCUMENTS

| | | |
|---|---|---|
| 2,999,000 A | 9/1961 | Spat |
| 6,098,753 A | 8/2000 | Lamarre et al. |
| 7,644,572 B2* | 1/2010 | Labala .................... F01D 25/18 |
| | | 184/11.2 |

FOREIGN PATENT DOCUMENTS

| | | | |
|---|---|---|---|
| DE | 101 39 141 A1 | 2/2003 | |
| GB | 274396 | 7/1927 | |
| GB | 812 186 | 4/1959 | |
| GB | 1 558 489 | 1/1980 | |
| JP | A-6-101749 | 4/1994 | |
| JP | 2002228089 A2 * | 8/2002 | |
| JP | A-2002-228089 | 8/2002 | |
| WO | WO 2011120771 A1 * | 10/2011 | .............. F16L 39/04 |

OTHER PUBLICATIONS

Jun. 6, 2013 Search Report issued in British Application No. 1222203.0.
European Search Report issued in European Application No. EP 13 00 5621 dated Feb. 18, 2014.

* cited by examiner

*Primary Examiner* — Jason Shanske
*Assistant Examiner* — Jason Mikus
(74) *Attorney, Agent, or Firm* — Oliff PLC

(57) ABSTRACT

An aircraft engine having a fan or propeller stage mounted to a planetary gearing system through a planetary gearing output drive shaft is provided with a lubricant system having a seal with lubricant delivery chamber for receiving a lubricant and a sealing surface sealing against a rotatable shaft, the rotatable shaft has a hollow interior and an opening in registration with the delivery chamber. The lubricant system has a lubricant pump in fluidical communication with and downstream of the opening.

14 Claims, 3 Drawing Sheets

LUBRICANT SYSTEM

TECHNICAL FIELD OF INVENTION

The invention relates to lubricant systems and methods of lubricating and particularly lubricant systems for aircraft engines. It finds particular application in lubricant systems for fan or propeller gearboxes.

BACKGROUND OF INVENTION

Certain aircraft engine architectures have fans or propellers that are connected to a drive input through a gearbox that optimises the rotational speed of the fan or propeller stage. Typically fan reduction gearboxes are based on epicyclic gear arrangements due to their compactness and high power density capacity. The two epicyclic variants that are most commonly used are either a star arrangement with a static planet carrier with a high speed input sun gear and the low speed output at the ring gear, or a planetary arrangement having a static ring gear with a high speed input sun gear and the low speed outlet at the rotating planet carrier.

For reduction gearboxes with rotating carriers it is necessary to lubricate the gears and bearings by transferring pressurised lubricant from a static structure to a rotating structure.

It is an object of the present invention to seek to provide an improve lubricant system and method of supplying lubricant to a desired location.

STATEMENTS OF INVENTION

According to a first aspect of the invention there is provided a lubricant system having a seal with lubricant delivery chamber for receiving a lubricant and a sealing surface sealing against a rotatable shaft, the rotatable shaft having a hollow interior and an opening in registration with the delivery chamber, wherein the lubricant system has a lubricant pump in fluidical communication with and downstream of the opening.

By downstream it is meant that the pump draws fluid through the opening by removing fluid from the hollow interior to generate a slightly negative pressure across the sealed joint between the delivery chamber and the hollow interior. This is in contrast to arrangements that use a pump to pressurise the fluid in the delivery chamber to force it through the opening. Beneficially, there is a ΔP between the delivery chamber 22 and immediately downstream of the opening to permit an increased tolerance range for the lubricant seals and reduce the possibility of lubricant leakage or air ingress into the lubricant system. The increased tolerance offers the further advantage that the seals may be used for a longer period before replacement may be required.

Multiple delivery chambers may be provided either arranged in a circumferential array extending around the circumference of the shaft or in an axial array spaced along the length of the shaft.

Preferably the seal is a collar arranged coaxially with the rotatable shaft, the sealing surface sealing against an external surface of the rotatable shaft.

Preferably the delivery chamber is annular. Preferably it has one inlet, or more preferably a plurality of inlets, that are connected to a source of lubricant. Advantageously, the use of multiple inlets fed by respective pipes mean that smaller pipe bores can be used. In an engine where space may be at a premium the multiple pipes can be routed around components in a way that may be impossible for a larger pipe. Advantageously, the source of the lubricant need not be maintained at high pressure, the pump being used to draw the lubricant from the delivery chamber.

The opening in the shaft that is in registration with the delivery chamber may be circular, slot shaped or any appropriate shape and a plurality of openings may be provided. Where more than one opening is used the openings may have the same or different cross-sections. The openings may be separately elected to permit a flow of lubricant to the interior of the shaft.

Preferably the hollow shaft has an internal lubricant transfer coupling which transfers the lubricant between the opening in the shaft and the lubricant pump. Preferably the transfer coupling is rotatable with the shaft as this means that a relative static seal may be used between the transfer coupling and the shaft. Such seals are easily formed and leak resistant. The transfer coupling is preferably connected to hollow shaft via a spline drive. Preferably one end of the transfer coupling is rigidly connected to the lubricant pump input. Advantageously, this prevents leakage of air into the lubricant or leakage of lubricant from the lubricant system at this connection. Additionally, where the transfer coupling rotates with the shaft the transfer coupling can also drive the pump to rotate at the same speed as the shaft.

The transfer coupling is preferably hollow and has one or more apertures in registration with the opening or openings in the shaft. The apertures preferably extend from an external surface sealing with the interior surface of the hollow shaft to the interior of the transfer coupling. The transfer coupling is preferably closed at one end to direct all the lubricant entering into its hollow bore to the pump.

The pump is preferably selected from the group comprising: vane pumps, gear pumps, gerotor pumps, or piston pumps. The pump may have a variable capacity which can enable control of the inlet conditions to the pump.

The capacity of the pump is preferably selected to generate the optimum pressure downstream of the shaft opening taking into account at least the supply pressure in the delivery chamber and the efficiency of the seal. The average static pressure downstream of the opening is selected to minimise the risk of leakage past the seal—either air into the lubricant system of lubricant from the lubricant system. The maximum ΔP across the seals or between the delivery chamber and downstream of the opening is preferably in the range of the likely range −1.0 to +5 bar. Advantageously, the selected ranges permit an increased tolerance range for the lubricant seals and reduce the possibility of lubricant leakage or air ingress into the lubricant system. The increased tolerance offers the further advantage that the seals may be used for a longer period before replacement may be required.

The pump may have multiple stages to advantageously permit the supply of lubricant at different pressures. Lubricant may therefore be supplied from the pump for one exemplary application as a cooling or lubricating fluid and for a second exemplary application as an actuating or hydraulic fluid.

Preferably the lubricant system supplies lubricant for a gearing system and preferably an epicyclic gearing system. The pump may supply lubricant to a plurality of spray outlets that direct the lubricant to the gears—either sun gears, planet gears, or ring gears as appropriate.

The lubricant system is preferably provided within an aircraft engine.

According to a second aspect of the invention there is provided an aircraft engine having a fan or propeller stage mounted to a planetary gearing system through a planetary gearing output drive shaft and having a lubricant system having a seal with lubricant delivery chamber for receiving a lubricant and a sealing surface sealing against a rotatable shaft, the rotatable shaft has a hollow interior and an opening in registration with the delivery chamber, wherein the lubricant system has a lubricant pump in fluidical communication with and downstream of the opening.

Preferably the lubricant pump is located radially inside the planetary gearing output drive shaft. Advantageously the pump may be used in an under-utilised location.

Preferably the lubricant pump is located axially forward of the planetary gearing system. Advantageously the pump may be used in an under-utilised location. The location being relatively simple to access should the pump fail or require maintenance.

According to a third aspect of the invention there is provided a method of passing a lubricant across a rotatable coupling, the method comprising the steps of delivering a lubricant to a seal having a lubricant delivery chamber for receiving the fluid and a sealing surface sealing against a rotating shaft having a hollow interior and an opening in registration with the lubricant delivery chamber, and operating a pump downstream of the opening to pump lubricant through the opening.

The lubricant is preferably an oil.

DETAILED DESCRIPTION OF INVENTION

Figure 1:
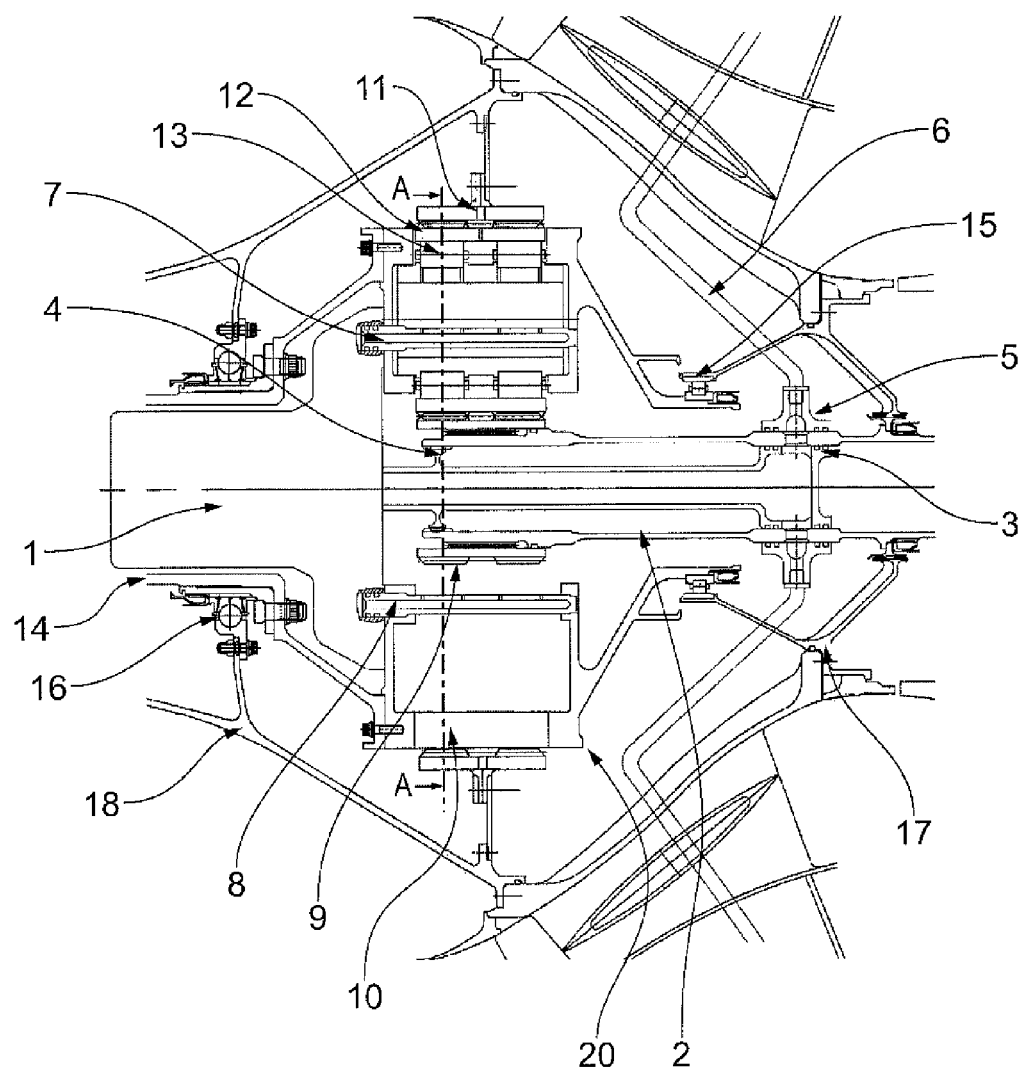
FIG. 1 depicts a schematic cross-section of a portion of an aircraft engine
Figure 3:
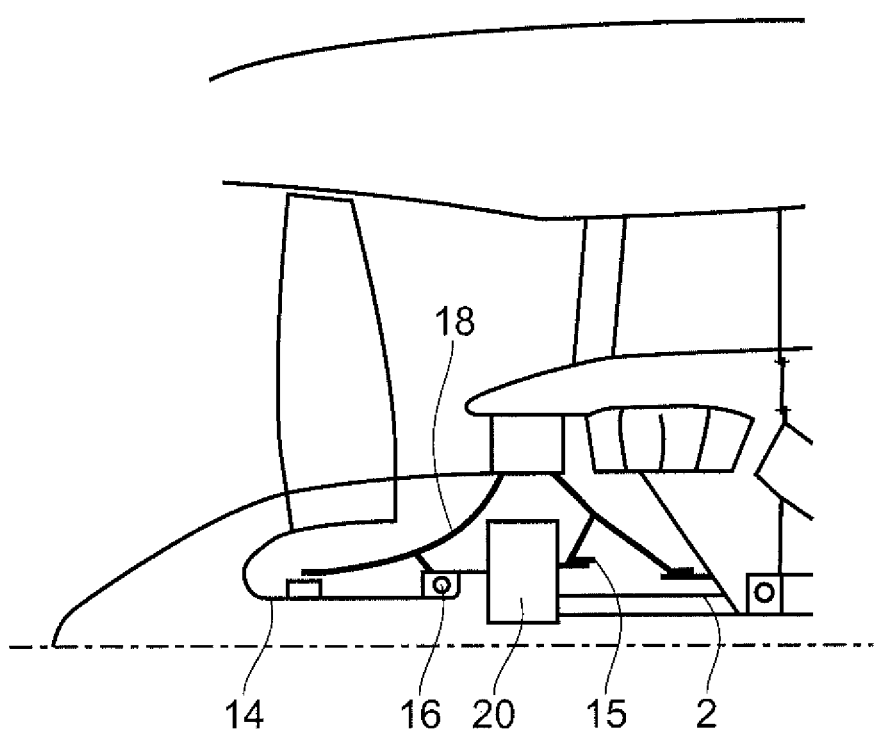
FIG. 3 depicts a further portion of the aircraft engine of FIG. 1

FIG. 1 depicts a schematic cross-section of a portion of an aircraft engine. The engine has a fan or propeller section (not shown) driven from a drive shaft 2 through a gearbox 20 via an output drive shaft 14. Each of the shafts is supported by appropriate support structures 17, 18 and bearings 15 and 16. The broader context of the engine showing a fan blade 40 is shown in FIG. 3.

The gearbox is of an epicyclic form and comprises a sun gear 9, planet gear 12 and a static ring gear 11 arranged in a conventional manner. The planet gear is supported by a bearing structure 13. The sun gear 9 is mounted to the drive shaft 2 via a splined joint that ensures the sun gear rotates at the same rotational velocity as the shaft. The planet gears have teeth that mesh with the sun gear and with the ring gear such that rotation of the sun gear causes rotation of the planet gears both about the axis of the respective planet gear and about the axis of the sun gear. A planet carrier 10 which connects all the planet gears with the output drive shaft rotates about the axis of the sun gear at the same speed at which the planet gears rotate about the axis of the sun gear. The rotational velocity of the planet carrier is the same as that as the output drive shaft 14. The relative rotational speeds of the output drive shaft and the input drive shaft is determined by the gearing ratio between the planet gears and the sun gear. A cross sectional view of the gearbox is depicted in FIG. 3. The effective pump rotational speed will be the resultant speed between the input and output shafts respectively.

Figure 2:
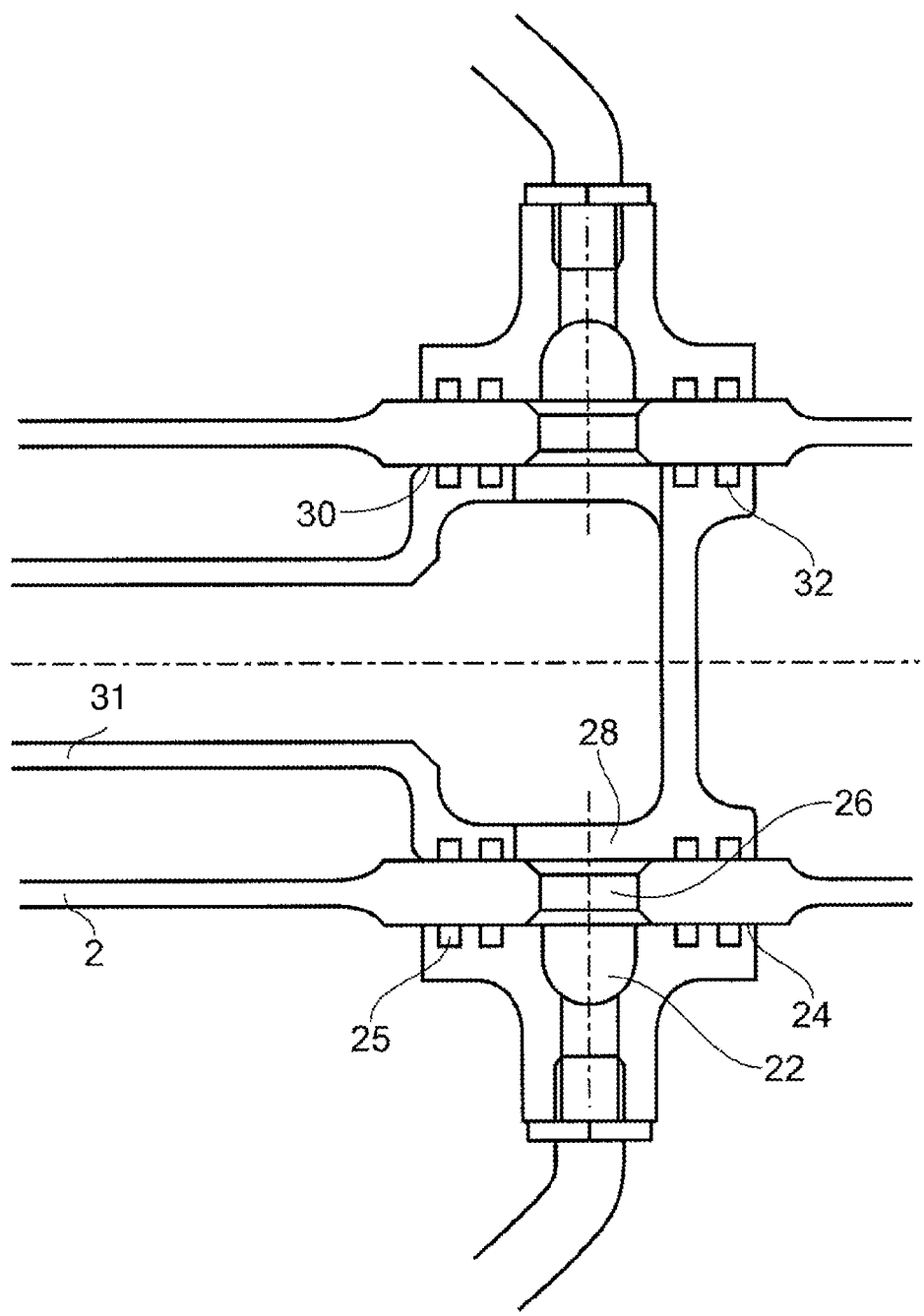
FIG. 2 is an enlarged view of the collar 5 and seal with the shaft.

It is necessary to lubricate the gears and bearing surfaces and a lubricant system is provided that comprises a lubricant supply pipe 6 which transfers lubricant from a source in the engine to a collar 5 that has an annular chamber 22 that extends about the external surface of the input drive shaft 2. FIG. 2 is an enlarged image of the collar 5 which has a sealing surface 24 that comprises a series of seal elements 25 that inhibits leakage of the lubricant within the chamber. The integrity of the seal joint is important as a flow across the seal and from the lubricant system requires a redundancy margin to be designed into the system e.g. increased flow rate capability, oil tank capacity, and scavenge pump capacity to ensure a minimum lubricant flow continues to reach the gearing. This can also result in over supply of lubricant that may result in over lubrication causing increased gearbox wear and heat generation.

The annular chamber communicates with an opening 26 in the input drive shaft that permits the lubricant to flow from the chamber into the interior of the shaft. The shaft contains an internal lubricant coupling 31 which transfers the lubricant to the pump. The lubricant coupling is a hollow conduit that is closed at one end and having an aperture 28 in registry with the opening in the input shaft. The aperture extends from the external surface of the transfer coupling to the inner bore. The external surface of the transfer coupling has a seal surface 30 with appropriate seal elements 32 which seals against the interior surface of the transfer shaft to inhibit leakage of lubricant from the lubricant system.

An open end of the lubricant coupling is rigidly connected to the pump inlet and the coupling has external splines that engage with splines on an inner surface of the input shaft to provide a spline drive 4 that transfers torque from the input shaft to the transfer coupling and this torque is then passed from the transfer coupling to the pump 1. The lubricant pump is integrated with the transfer coupling and is therefore driven at the resultant rotational velocity from the input and output shafts.

The pump capacity is selected to generate, at worst, a slightly negative pressure across the sealed joint between the delivery chamber and the transfer coupling bore taking into account the main pump supply pressure and the centrifugal effect across the joint. Beneficially, there is a ΔP between the delivery chamber 22 and immediately downstream of the opening in the likely range −1 to +5 bar. These ranges permit an increased tolerance range for the lubricant seals and reduce the possibility of lubricant leakage or air ingress into the lubricant system. The increased tolerance offers the further advantage that the seals may be used for a longer period before replacement may be required.

As the end of the transfer coupling is integrally connected to the pump inlet and rotates with the pump inlet there is no leakage at this joint to allow air ingress or lubricant leakage. Therefore the number of joints from which leakage may occur is kept low. The pump and the transfer coupling may be integrally formed as a unit that may be removed from the shaft 2. The seals 3, being static relative to the shaft, can then be easily replaced if required.

Any suitable lubricant pump type may be used e.g. gear, gerotor or piston but should be capable of rotating at the speed of the input drive shaft, typically of the order 3-10 thousand revolutions per minute and delivering sufficient lubricant to the gears, typically of the order 100 to 200 litres per minute.

Each outlet from the pump 1 is connected to a suitable delivery device that supplies the lubricant in an appropriate form and volume. In the arrangement of FIG. 1 the delivery device is a spray bar 7 that directs a continual spray of lubricant onto the planet gears and bearing or a spray bar 8 that directs a continual spray of lubricant onto the sun gears. The outlets rotate at the same speed as that of the planet gears rotate around the sun gear.

A particularly preferred pump is a gear pump with a plurality of stages that can be arranged in series and which enable a single pump assembly to provide lower pressure lubricant suitable for lubricating the bearings and gears as well as higher pressure lubricant that may be used in an hydraulic system for, for example, actuating variable pitch aerofoils such as those used in open-rotor applications. It is desirable for the pump to have multiple outlets for delivering lubricant at the same or different pressures.

Although the specific embodiment has been described with respect to delivering lubricant to a fan or propeller speed reduction gear train it will be appreciated that the invention will also find application in other areas where is necessary to deliver fluid across a rotating seal joint.

The invention claimed is:

1. An aircraft engine having a fan or propeller stage mounted to a planetary gearing system through a planetary gearing output drive shaft and having a lubricant system having a seal with a lubricant delivery chamber for receiving a lubricant and a sealing surface sealing against a rotatable shaft, the rotatable shaft being configured to drive a sun gear of the planetary gearbox and having a hollow interior and an opening in registration with the delivery chamber,
   wherein the lubricant system has a lubricant pump in fluidical communication with and downstream of the opening;
   wherein the rotatable shaft has an internal hollow lubricant transfer coupling rotatable with the rotatable shaft having one or more apertures in registration with the opening or openings in the rotatable shaft and which transfers the lubricant between the opening in the rotatable shaft and the lubricant pump; and
   wherein the transfer coupling is connected to the pump via a torque coupling which transfers torque from the coupling to the pump.

2. The aircraft engine according to claim 1, wherein the lubricant pump is located radially inside the planetary gearing output drive shaft.

3. The aircraft engine according to claim 1, wherein the lubricant pump is located axially forward of the planetary gearing system.

4. The aircraft engine according to claim 1, wherein the seal is a collar arranged coaxially with the rotatable shaft, the sealing surface sealing against an external surface of the rotatable shaft.

5. The aircraft engine according to claim 1, wherein the delivery chamber is annular.

6. The aircraft engine according to claim 5, wherein the delivery chamber has a plurality of inlets, that are connected to a source of lubricant.

7. The aircraft engine according to claim 1, wherein the torque coupling is connected to a pump inlet to permit passage of lubricant from the transfer coupling to the pump.

8. The aircraft engine according to claim 1, wherein the apertures extend from an external surface sealing with the interior surface of the rotatable shaft to the interior of the transfer coupling.

9. The aircraft engine according to claim 1, wherein the pump is selected from the group comprising: vane pumps, gear pumps, gerotor pumps, or piston pumps.

10. The aircraft engine according to claim 1, wherein the pump has a first stage and a second stage and a first outlet and a second outlet, the first stages supplying lubricant to the first outlet, the second stage supplying lubricant to the second outlet; the pressure of the lubricant at the first outlet being different to the pressure of the lubricant at the second outlet.

11. The aircraft engine according to claim 1, wherein the pump has an outlet that supplies lubricant to a gearing system.

12. The aircraft engine according to claim 11, wherein the gearing system drives an output shaft for a fan or propeller stage of a gas turbine.

13. The aircraft engine according to claim 12, wherein the outlet is a spray outlet.

14. The aircraft engine according to claim 3, wherein the transfer coupling extends from an axially rearward end of the planetary gearbox to an axially forward end of the planetary gearbox.

* * * * *